(12) United States Patent
Giboney et al.

(10) Patent No.: US 6,835,003 B2
(45) Date of Patent: Dec. 28, 2004

(54) INTEGRATED PACKAGING SYSTEM FOR OPTICAL COMMUNICATIONS DEVICES THAT PROVIDES AUTOMATIC ALIGNMENT WITH OPTICAL FIBERS

(75) Inventors: Kirk S. Giboney, Mountain View, CA (US); Paul K. Rosenberg, Sunnyvale, CA (US); Albert T. Yuen, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/954,384

(22) Filed: Sep. 10, 2001

(65) Prior Publication Data

US 2002/0021874 A1 Feb. 21, 2002

Related U.S. Application Data

(63) Continuation of application No. 09/248,877, filed on Feb. 11, 1999, now Pat. No. 6,318,909.

(51) Int. Cl.⁷ .............................................. G02B 6/36
(52) U.S. Cl. .............................. 385/90; 385/88; 385/89; 385/92; 257/700
(58) Field of Search ............................ 385/88, 89, 90, 385/92, 49, 14; 257/668, 700, 712

(56) References Cited

U.S. PATENT DOCUMENTS

| | | |
|---|---|---|
| 5,091,991 A | 2/1992 | Briggs et al. |
| 5,202,943 A | 4/1993 | Carden et al. |
| 5,432,630 A | 7/1995 | Lebby et al. |
| 5,742,480 A * | 4/1998 | Sawada et al. ............. 361/749 |
| 5,768,456 A | 6/1998 | Knapp et al. |
| 5,883,748 A * | 3/1999 | Shum ......................... 359/819 |
| 5,933,558 A | 8/1999 | Sauvageau et al. |
| 5,937,114 A * | 8/1999 | Fisher et al. .................. 385/14 |
| 6,056,448 A | 5/2000 | Sauter et al. |
| 6,394,664 B1 * | 5/2002 | Isaksson ...................... 385/88 |

* cited by examiner

Primary Examiner—Rodney Bovernick
Assistant Examiner—Sung Pak
(74) Attorney, Agent, or Firm—Ian Hardcastle

(57) ABSTRACT

The packaging system comprises a mechanical support, an insulating substrate and an electronic circuit. The mechanical support has a first support element that extends at a non-zero angle from a second support element. The insulating substrate has a first portion and a second portion in contact with the first support element and the second support element, respectively. The first portion is contoured to define at least one access hole. The optical communications device and the electronic circuit are mechanically coupled to the first support element. Either or both the optical communications device and the electronic circuit is mechanically coupled to the first support element through a respective one of the at least one access hole. The packaging device additionally comprises a conductive track extending between the electronic circuit and the optical communications device on the first portion of the insulating substrate.

6 Claims, 13 Drawing Sheets

INTEGRATED PACKAGING SYSTEM FOR OPTICAL COMMUNICATIONS DEVICES THAT PROVIDES AUTOMATIC ALIGNMENT WITH OPTICAL FIBERS

CROSS REFERENCE TO RELATED APPLICATION(S)

This is a continuation of application Ser. No. 09/248,877 filed on Feb. 11, 1999 now U.S. Pat. No. 6,318,909.

GOVERNMENT RIGHTS

The invention was made with United States Government support under Agreement No. MDA972-97-3-0008 awarded by DARPA. The United States Government has rights in the invention.

FIELD OF THE INVENTION

The invention generally relates to packaging systems for optical communication devices, and, in particular, to an integrated packaging system for packaging an optical communications device that provides automatic alignment between the optical communications device and an optical fiber mounted in a fiber optic connector.

BACKGROUND OF THE INVENTION

In typical optical fiber-based optical communication systems, an optical communications device transmits optical signals to, or receives optical signals from, one or more optical fibers. The optical fibers are mounted in a fiber optic connector that positions the ends of the optical fibers in close proximity to the optical communications device. When transmitting, the optical communications device converts electrical signals into optical signals and transmits the optical signals into the optical fibers. When receiving, the optical communications device receives the optical signals from the optical fibers and converts the optical signals into electrical signals.

To transmit an optical signal to or to receive an optical signal from an optical fiber, the optical communications device must be precisely positioned in three dimensions relative to the end of the optical fiber. If the element of the optical communications device that transmits or receives the optical signal is not precisely aligned with the core of the optical fiber, the quality of the optical communication can be significantly degraded. However, the core of the optical fiber has cross-sectional dimensions in the order of a few microns to a few hundred microns so that precisely aligning the core of the optical fiber with respect to the optical communications device can difficult.

Although packages for optical communications devices exist capable of aligning the optical communications device with optical fibers, such packages suffer from shortcomings: typically, conventional packages are complex and are difficult to use to align the optical fibers with the optical communications device with the precision needed for optimum optical signal transfer between the optical fibers and the optical communications device. For example, many conventional optical communications device packages do not automatically align the optical fibers with the optical communications device with the required precision. Therefore, additional steps are required to provide the required precision. For example, the conventional device packages may bring the optical fibers within close proximity of the optical communications device. Then, the optical fibers have to be slightly repositioned to provide the required precision. Such repositioning can be difficult and expensive to perform. In addition, many conventional optical device packages are complex, and include a large number of components. The complexity of conventional optical communications device packages and their difficulty of use significantly increases the cost of such packages.

Thus, an unaddressed need exists in the industry for a simple, low-cost packaging system for an optical communications device that provides an automatic alignment between the optical communications device and optical fibers mounted in an fiber optic connector.

SUMMARY OF THE INVENTION

Embodiments of the invention provide an integrated packaging system for packaging an optical communications device. The packaging system comprises a mechanical support, an insulating substrate and an electronic circuit and a conductive track. The mechanical support has a first support element and a second support element. The first support element extends at a non-zero angle from the second support element. The insulating substrate has a first portion and a second portion in contact with the first support element and the second support element, respectively. The first portion is contoured to define at least one access hole. The optical communications device and the electronic circuit are mechanically coupled to the first support element of the mechanical support. Either or both the optical communications device and the electronic circuit is mechanically coupled to the first support element through a respective one of the at least one access hole. The packaging device additionally comprises a conductive track extending between the electronic circuit and the optical communications device on the first portion of the insulating substrate.

In one embodiment, the mechanical support is thermally conductive, and at least one of the optical communications device and the electronic circuit is thermally coupled to the first support element to enable the mechanical support to function as a heatsink for the at least one of the optical communications device and the electronic circuit.

In another embodiment, the insulating substrate is flexible.

In another embodiment, the optical communications device is electrically insulated from the mechanical support.

BRIEF DESCRIPTION OF THE DRAWINGS

The invention can be better understood with reference to the following drawings. The elements of the drawings are not necessarily drawn to scale relative to each other. Instead, emphasis is placed upon clearly illustrating the invention. Like reference numerals designate corresponding parts throughout the several views.

DETAILED DESCRIPTION OF THE INVENTION

Figure 1A:
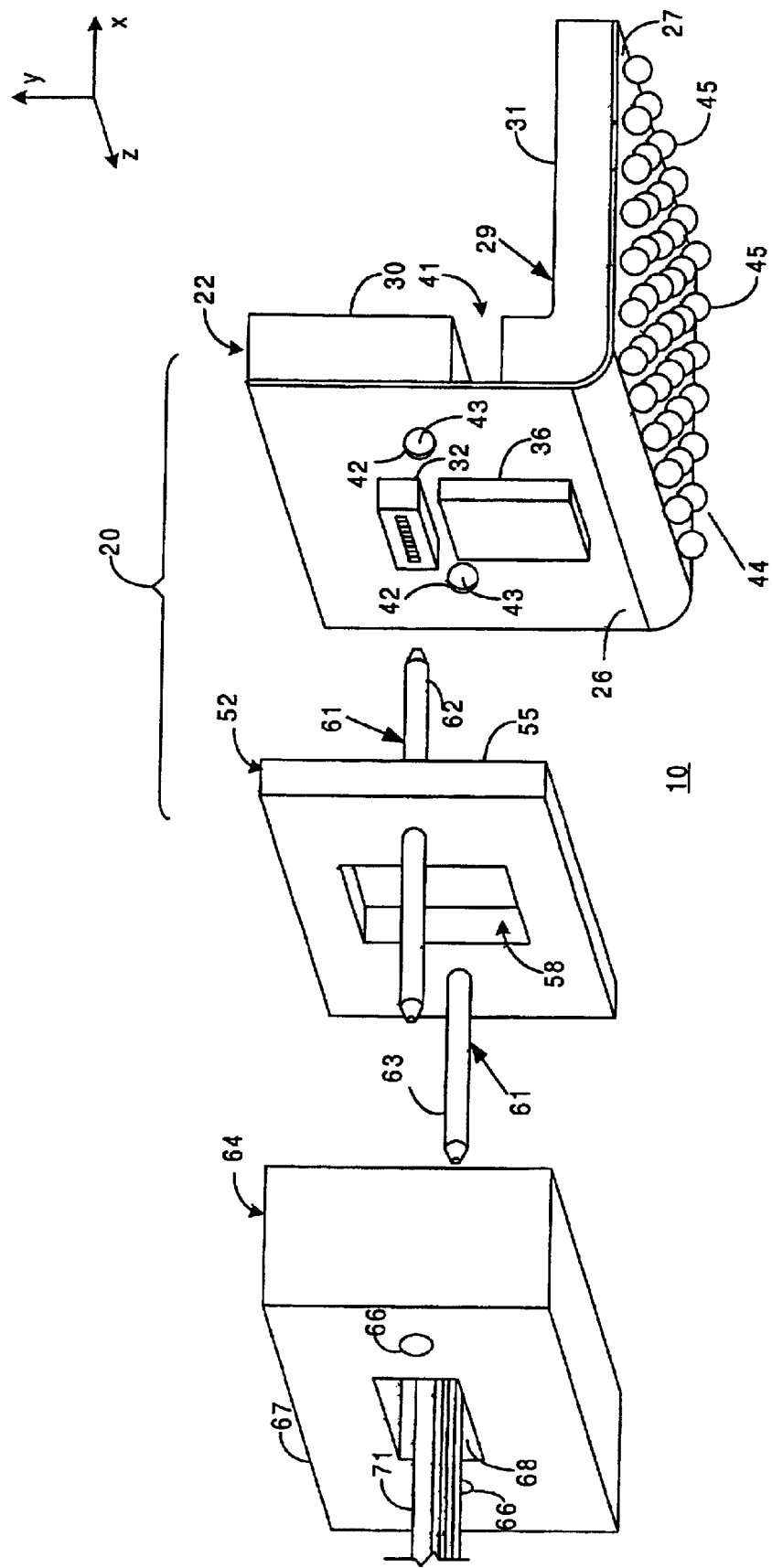
FIG. 1A is an exploded isometric side view of an embodiment of an integrated packaging system for an optical communications device according to the invention.

The invention provides an integrated packaging system for an optical communications device. The integrated packaging system automatically provides a precision alignment between the optical communications device and an optical fiber mounted in a fiber optic connector. The optical fiber is typically part of a fiber optic ribbon cable or some other orderly arrangement of optical fibers mounted in the fiber optic connector. FIG. 1A is an exploded isometric side view showing an example of the integrated packaging system 10 according to the invention. The main components of the integrated packaging system are the device package 20 and the fiber optic connector 64. The device package is shown as including the device mounting 22 and the cover assembly 52.

The device mounting 22 provides mechanical support for, and electrical connections to the optical communications device 32. The device mounting may additionally act as a heatsink for the optical communications device. The optical communications device includes an array of electro-optical elements such as lasers, LEDs and photodiodes capable of transmitting or receiving optical signals. In its simplest form, the optical communications device includes a single electro-optical element. The device mounting may also accommodate additional electronic circuits that are directly or indirectly electrically connected to the optical communications device. For example, such electronic circuits may drive a laser constituting one of the electro-optical elements of the optical communications device, or may amplify the electrical signal generated by a photodiode constituting one of the electro-optical elements of the optical communications device. An exemplary electronic circuit is shown at 36.

The device mounting may also include the electrical connector 44 that provides electrical connections to the integrated packaging system 10. The electrical connector may also mechanically mount the integrated packaging system 10 on a printed circuit board, such as the mother board 47 shown in FIG. 1F.

The device package 20 may also include the cover assembly 52 that covers the optical communications device 32 to protect the optical communications device. The cover assembly is composed of the cover 55 and the aligning members 61. The window 58 defined in the cover allows light to pass to and from the optical communications device. Further protection for the optical communications device is provided by the light-transmitting element 59 mounted in or over the window. The light transmitting element may be a sheet of transparent material such as glass or plastic, or may include an array of optical elements, such as a micro-lens array or an array of optical fibers. In its simplest form, the array of optical elements is composed of a single optical element. The window 59, the light-transmitting element 59 and the cover 55 may be integrated into a single element by fabricating the cover from a light-transmitting material. Fabricating the cover from a light-transmitting material enables the cover to protect the optical communications device while allowing light to pass to and from the optical communications device.

The optical communications device 32 transmits optical signals to, or receives optical signals from, the fiber optic ribbon 71 mounted in the fiber optic connector 64. In its simplest form, the fiber optic ribbon may be composed of a single optical fiber.

The fiber optic ribbon 71 must be precisely aligned relative to the optical communications device 32 to ensure the optimum transfer of optical signals between the fiber optic ribbon and the optical communications device. The integrated packaging system 10 automatically aligns the fiber optic ribbon relative to the optical communications device with the required precision. To effect this alignment, in the embodiment shown, the device mounting 22 and the part of the cover assembly 52 facing the device package include complementary alignment features, and the fiber optic connector 64 and the part of the cover assembly 52 facing the fiber optic connector include complementary alignment features. In addition, the optical communications device and the alignment feature of the device mounting have a precisely-defined positional relationship with respect to one another, the fiber optic ribbon and the alignment feature of the fiber optic connector have a precisely-defined positional relationship with respect to one another and the alignment features of the cover assembly have a precisely-defined positional relationship with respect to one another. Moreover, the cover alignment features and any optical element mounted in the cover 55 have a precisely-defined positional relationship with respect to one another.

When the cover assembly 52 is installed on the device mounting 22 during assembly of the device package 20, the complementary alignment features of the cover assembly and the device mounting engage with one another and precisely define the position of the cover assembly relative to the device mounting. When the fiber optic connector 64 is later plugged into the device package, the complementary alignment features of the fiber optic connector and the cover assembly engage with one another and precisely define the position of the fiber optic connector relative to the cover assembly. Since the optical communications device 32 and the fiber optic ribbon 71 have precisely-defined positional relationships with respect to their respective alignment features, the alignment features collectively precisely define the position of the fiber optic ribbon relative to the optical communications device.

In the embodiment shown in FIG. 1A, the alignment feature of the device mounting, which will be called the device alignment feature, is composed of the alignment holes 43 defined in the mechanical support that constitutes part of the device mounting; the alignment feature of the fiber optic connector, which will be called the connector alignment feature is composed of the alignment holes 66 defined in the fiber optic connector; and the alignment features of the cover, which will be called the cover alignment features, are composed of the aligning members 61 extending through the cover 55. Each cover aligning member is composed of an aligning member portion 62 and an aligning member portion 63. The aligning member 62 engages with one of the alignment holes 43 in the device mounting and the aligning member 63 engages with one of the alignment holes 66 in the fiber optic connector.

The alignment features described above can also be used to align an array of optical elements mounted in the window 58 of the cover 55 with the desired precision relative to either or both of the optical communications device 32 and the fiber optic ribbon 71. This is done by locating the optical element array in a precisely-defined positional relationship with respect to the cover alignment features 61. If a transparent layer is mounted in or over the window 58, or if some other element that does not require precise alignment relative to the optical communications device or the fiber optic ribbon is mounted in the window 58, the cover alignment features be omitted and complementary device and connector alignment features may instead be provided. Moreover, embodiments in which the device package lacks a cover assembly may include only complementary device and connector alignment features.

In a further variation, the device alignment feature forms part of a modified cover assembly, and is located on the part of the cover that faces the fiber optic connector 64. The fiber optic connector includes a connector alignment feature complementary to the device alignment feature. In this embodiment, an active alignment process that will be described below is used during assembly of the device package 20 to position the cover assembly on the device mounting at a location where the device alignment feature and the optical communication device 32 mounted on the device mounting have a precisely-defined positional relationship with respect to one another.

The device mounting 22 of the integrated packaging system 10 will now be described with reference to FIGS. 1B–1F, and with additional reference to FIG. 1A. The device mounting is based on the mechanical support 29. The mechanical support is composed of two main elements, the support element 30 and the support element 31. The support element 31 extends from the support element 30 at a nonzero angle thereto, and preferably substantially orthogonally thereto. The mechanical support may be formed by molding a suitable material to define the support elements 30 and 31, or by bending a single piece of material to form the support elements 30 and 31. The mechanical support may alternatively be fabricated by joining the support elements 30 and 31 to one another to form an integral unit. Although the mechanical support may have shapes different from that shown, in the preferred embodiment, the mechanical support is L-shaped as shown. The advantages of this shape will be described below.

Figure 7:
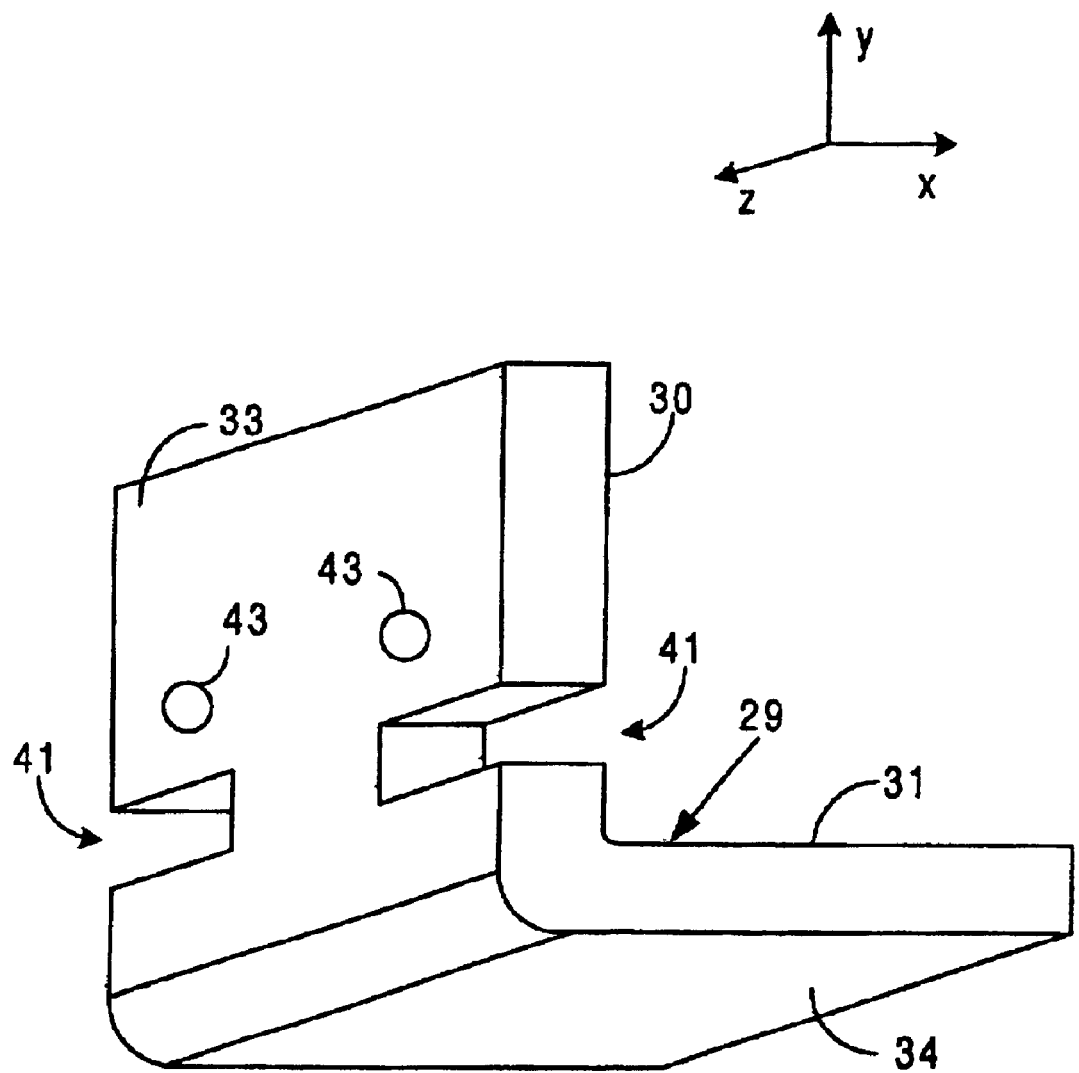
FIG. 7 is an isometric side view of the mechanical support forming part of the device package shown in FIGS. 1B–1F.

The mechanical support 29 supports the printed circuit board 25. The printed circuit board is preferably bonded to the mechanical support. The mechanical support provides the printed circuit board with mechanical stability so that the position of printed circuit board can be accurately defined relative to the positions of other components mechanically coupled to the mechanical support. This will be discussed in further detail below. The printed circuit board includes conductive tracks (not shown to simplify the drawings) that transfer electrical signals to, from and between electronic components electrically connected to them. Although rigid circuit boards or circuit boards other than printed circuit boards can be used, the printed circuit board 25 is preferably a flexible printed circuit board. Using a flexible printed circuit board as the printed circuit board 25 improves the ease of manufacturing, as will be described in further detail below. The flexibility of the flexible printed circuit also enables the printed circuit board to wrap around the outward-facing surfaces 33 and 34 of the support elements 30 and 31 constituting the mechanical support. The surfaces 33 and 34 are shown in FIG. 7. The flexible printed circuit extending from the support element 30 to the support element 31 and conducts electrical signals between the electrical connector 44 mounted on the portion 27 of the printed circuit board covering the surface 34 of the support element 31 to the electronic components electrically connected to the portion 26 of the printed circuit board covering the surface 33 of the support element 30. A similar conduction of electrical signals can be provided using non-flexible printed circuit boards.

The optical communications device 32 is mechanically coupled to the mechanical support 29 and is electrically connected to one or more of the conductive tracks on the printed circuit board 25. The optical communications device may transmit one or more optical signals in response to respective electrical signals received via the printed circuit board, or may transfer one or more electrical signals to the printed circuit board in response to corresponding optical signals, or may both transmit and receive optical signals corresponding to respective electrical signals. When transmitting, the optical communications device receives electrical signals from the printed circuit board 25, converts the electrical signals into respective optical signals and transmits the optical signals to the optical fibers constituting the fiber optic ribbon 71. When receiving, the optical communications device receives optical signals from the optical fibers constituting the fiber optic ribbon 71, converts the optical signals into electrical signals and transmits the electrical signals to the printed circuit board 25.

For simplicity, the integrated packaging system 10 will be described in further detail below using an example in which the optical communications device 32 receives optical signals from the fiber optic ribbon 71. However, the integrated packaging system 10 is not limited to packaging an optical communications device that receives optical signals. The integrated packaging system can be used to package an optical communications device that transmits optical signals to the fiber optic ribbon, or that transmits optical signals to some of the optical fibers constituting the fiber optic ribbon and receives optical signals from others of the optical fibers.

Various electronic components, such as resistors, capacitors, inductors, transistors, integrated circuits, and sub-assemblies including resistors, capacitors, inductors, transistors and integrated circuits, can be mounted on the printed circuit board 25 to process the electrical signals transmitted to and received from the optical communications device 32. The actual processing applied to the electrical signals can depend on the application in which integrated packaging system 10 is used. For example, it is generally desirable to amplify the electrical signals generated by the optical communications device 32 in response to the optical signals received from the fiber optic ribbon 71. The embodiment shown in FIGS. 1A–1F is shown as including the electronic circuit 36, which may be an integrated circuit, that amplifies the electrical signals generated by the optical communications device. The electronic circuit may also perform processing on the electrical signals in addition to amplification. The electronic circuit is electrically connected to the printed circuit board 25 through which it directly or indirectly receives the electrical signals from the optical communications device as input signals. The electronic circuit may also pass output signals directly or via other circuits to the electrical connector 44 so that such signals may be output by the integrated packaging system 10.

As well as being electrically connected to the printed circuit board 25, the electronic circuit 36 is also preferably mechanically and electrically coupled to the mechanical support 29. The mechanical support 29 is preferably fabricated from a material, such as copper, that has high electrical and thermal conductivities. These properties enable the mechanical support to function both as a heat sink for the electronic circuit and as a low-impedance current path between the electronic circuit and a voltage source. The mechanical support may alternatively be fabricated from other materials having high electrical and thermal conductivities.

Figure 1B:
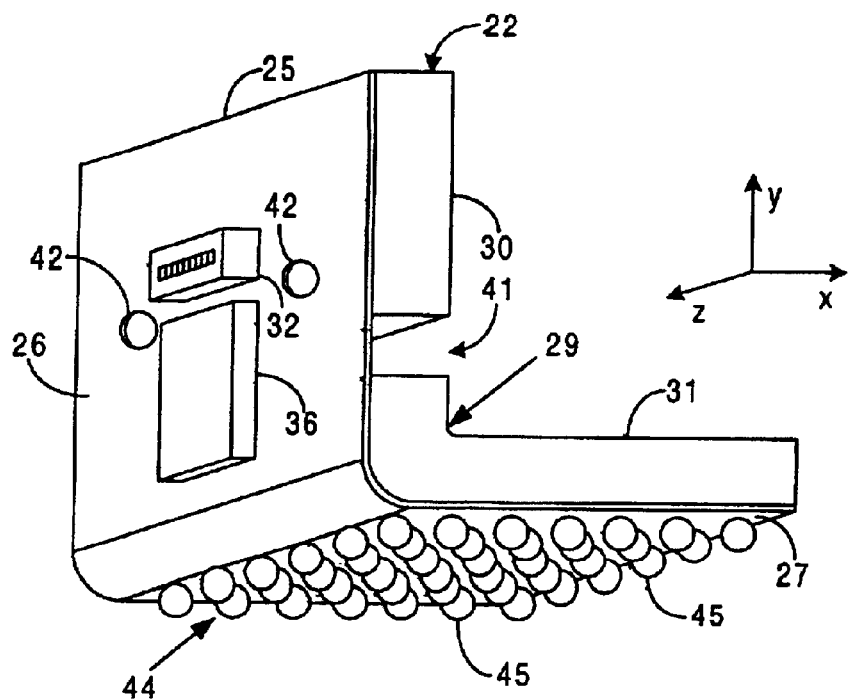
FIG. 1B is an isometric side view of the device package of the integrated packaging system according to the invention.
Figure 1C:
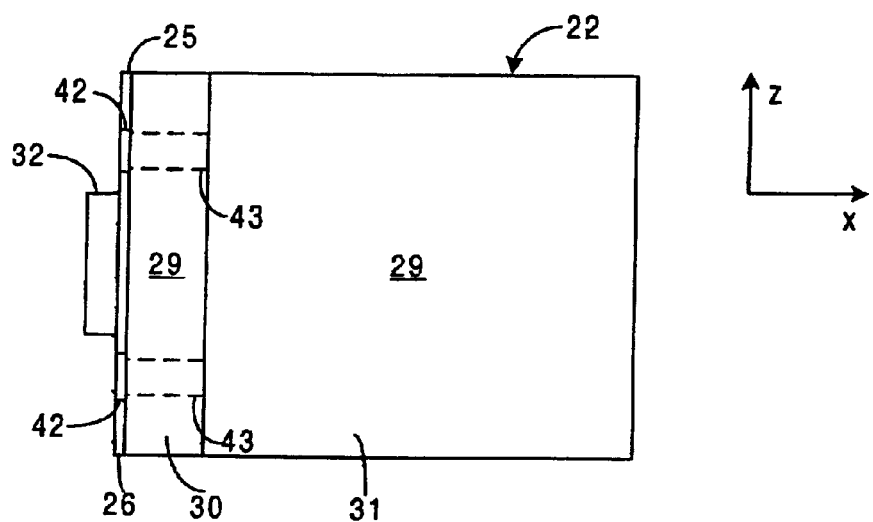
FIG. 1C is a top view of the device package depicted in FIG. 1B.
Figure 1D:
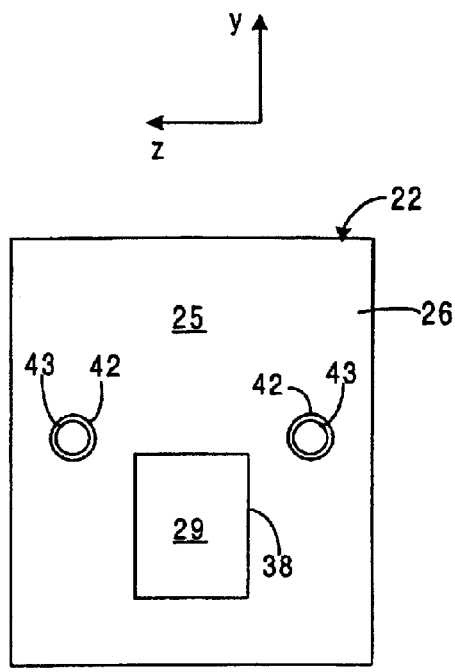
FIG. 1D is a front view of the device package depicted in FIG. 1B.

FIG. 1D shows an example of a way of providing contact between the electronic circuit 36 and the mechanical support 29. In this, the printed circuit board defines the access hole 38 through which at least part of the electronic circuit extends into contact with the mechanical support.

Fabricating the mechanical support 29 from a material having a high thermal conductivity and mechanically coupling the electronic circuit 36 to the mechanical support allows the mechanical support to act as a heat sink for the electronic circuit. The performance of the electronic circuit is improved by the mechanical support conducting away heat generated in the electronic circuit.

Fabricating the mechanical support 29 from a material having a high electrical conductivity, electrically connecting the electronic circuit 36 to the mechanical support and electrically connecting the mechanical support to a source of a voltage required by the electronic circuit allows the mechanical support to provide a low-impedance path for current to flow between the electronic circuit the voltage source. The voltage source may be a ground connection, a voltage source such as a power supply, a signal source or any other source of voltage that requires a low-impedance path between it and the electronic circuit. One or more of the tracks on the printed circuit board 25 may be connected to the same voltage source as that connected to the electronic circuit via the mechanical support.

Other electronic components electrically connected to the printed circuit board 25 can also be mechanically coupled to the mechanical support 29 to use the mechanical support as a heat sink, or as a low-impedance current path to a voltage source, or both, as described above. Suitable electrical insulators with a high thermal conductivity may be used to electrically insulate a component from the mechanical support while still taking advantage of the heat sinking capability of the mechanical support. Using the mechanical support as a heat sink, as a low-impedance current path to a voltage source, or as both reduces the complexity of the integrated packaging system 10, since additional separate subsystems or components for providing heat sinking and low-impedance current paths are not required. Therefore, using the mechanical support as a heat sink and as a low-impedance current path simplifies the integrated packaging system 10 and makes it easier to manufacture.

In addition, using the mechanical support 29 to provide a low-impedance current path to the electronic circuit 36 provides a lower-impedance current path than can be provided by the tracks on the printed circuit board 25. The conductive area of the mechanical support is orders of magnitude greater than that of a typical track on the printed circuit board. Therefore, the impedance of the current path provided by the mechanical support is orders of magnitude smaller than that of the typical track.

As noted above, the optical communications device 32 is mechanically coupled to the mechanical support 29. As well as providing heat sinking and a low-impedance current path for the optical communications device, mechanically coupling the optical communications device to the mechanical support enables the optical communications device to be accurately positioned relative to the alignment holes 43 located in the mechanical support, as will be described in more detail below.

Figure 1E:
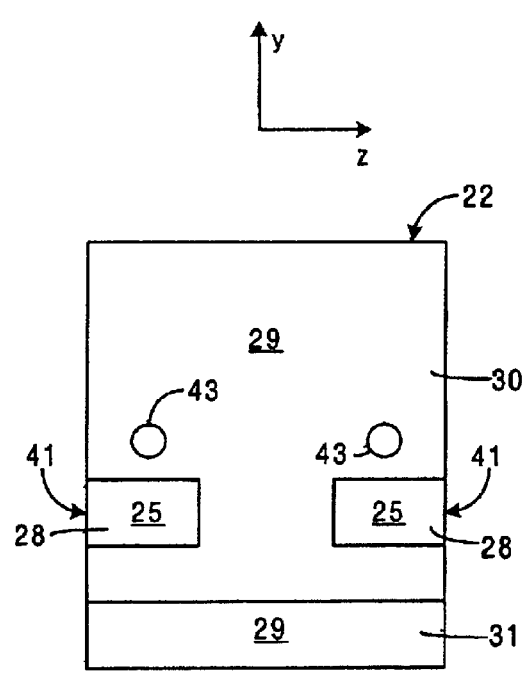
FIG. 1E is a back view of the device package depicted in FIG. 1B.

FIG. 1E shows an embodiment of the mechanical support 29 in which the notches 41 are formed to expose respective portions of the surface 28 of the printed circuit board 25 facing the surface 33 (FIG. 7) of the mechanical support. Additional electronic components (not shown) can be mounted on the portions of the surface 28 exposed by the notches 41. Mounting electronic components on both sides of the printed circuit board 25 maximizes usage of the area of the printed circuit board. A way of further increasing the effective area of the printed circuit board within the confines of the dimensions of the mechanical support will be described below with reference to FIG. 9.

As noted above, the two alignment holes 43 preferably extend into or through the mechanical support 29, as shown in FIGS. 1B–1E. The alignment holes serve as the device alignment feature in this embodiment. FIG. 1C shows the access holes 42 that extend through the printed circuit board 25 to provide access to the alignment holes 43 through the printed circuit board. The access holes preferably have dimensions in the plane parallel to the major surface of the portion 26 of the printed circuit board as large as, or larger than, the dimensions of the alignment holes 43 in the same plane. The optical communications device 32 is coupled to the mechanical support and has a precisely-defined positional relationship relative to the alignment holes 43 to enable a connector alignment feature directly or indirectly engaging with the alignment holes 43 to provide a precision alignment of the fiber optic ribbon 71 relative to the optical communications device 32, as will be described in more detail below.

The portion 27 of the printed circuit board 25 mounted on the support element 31 constituting part of the mechanical support 29 preferably includes the electrical connector 44, as shown in FIG. 1B. The electrical connector is preferably electrically connected to a number of tracks on the printed circuit board 25 so that electrical signals can pass between the printed circuit board 25 and the electrical connector. Electrical connections outside of the device package, such as the pads 46 on the exemplary mother board 47 shown in FIG. 1F, can engage the electrical connector 44 to transfer electrical signals and power connections to the electrical connector. This enables electrical signals generated in response to the optical signals received by the optical communications device 32 to pass to other systems via the printed circuit board 25 and the electrical connector 44. Alternatively, electrical signals received from other systems can pass to the optical communications device 32 via electrical connector 44 and printed circuit board 25. In the preferred embodiment, the electrical connector 44 is composed of an array of solder balls, as shown in FIG. 1B. Exemplary solder balls are shown at 45.

Figure 1F:
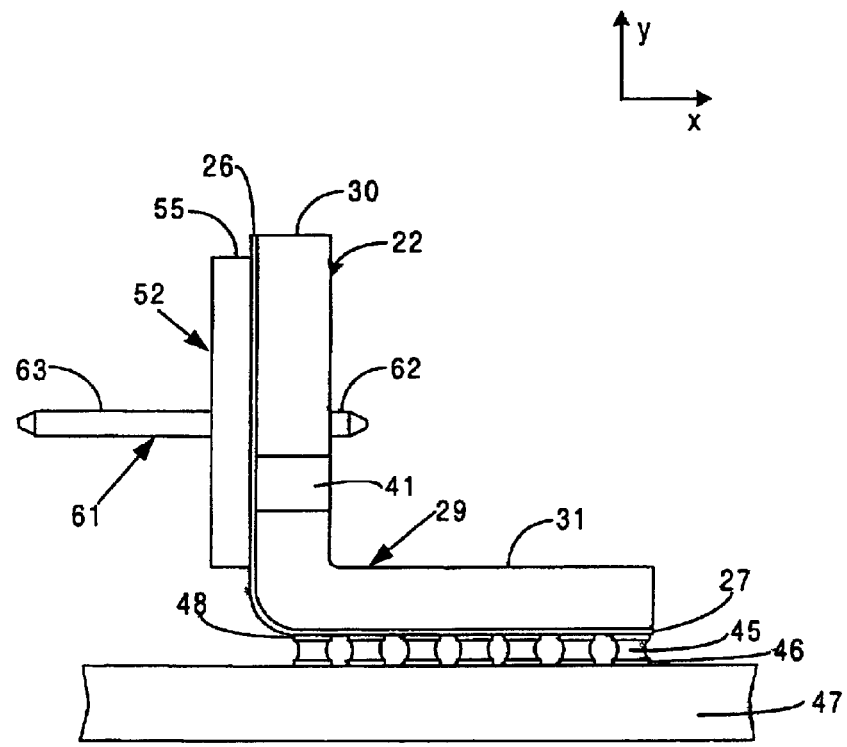
FIG. 1F is a side view of the device package depicted in FIG. 1B installed on a printed circuit motherboard.

FIG. 1F is a side view of the device package 20 mounted on the mother board 47 by means of the electrical connector 44. Each of the solder balls 45 constituting the electrical connector is located on a pad in the portion 27 of the printed circuit 25. An exemplary pad is shown at 48. A corresponding array of pads is located on the mother board on which the device package is mounted. An exemplary pad is shown at 46. When the device package is mounted on the mother board, the electrical connector establishes a strong mechanical bond and low-impedance electrical connections between the device package and the mother board. The device package is mounted on the mother board by placing the solder balls in contact with the respective pads on the mother board and applying heat to melt the solder balls. The surface tension of the molten solder pulls the device package into alignment with the mother board so that the location of the device package on the mother board is accurately defined the solder cools and solidifies. FIG. 1F shows the device package after the solder balls have been melted. The heat may alternatively melt a solder paste applied to the pads on the mother board. When the molten solder cools and solidifies, it fixes the solder balls to the pads.

Although the solder ball-based electrical connector 44 shown in FIGS. 1B and 1F is preferred, many other suitable types of electrical connections suitable for electrically connecting to the printed circuit board 25 are known and may be used if desired.

Figure 2A:
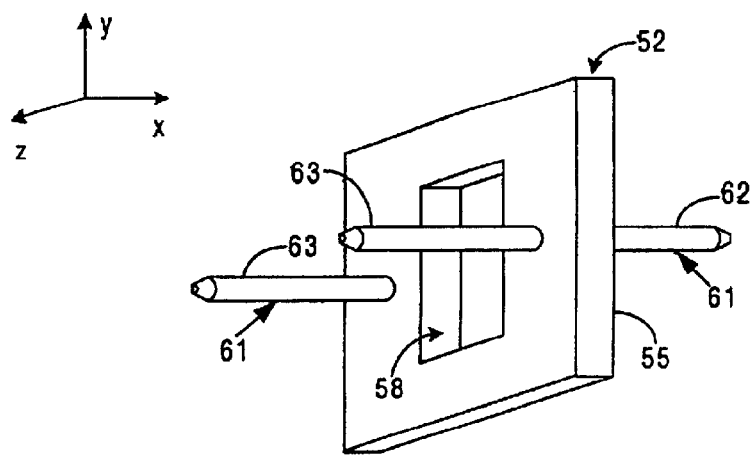
FIG. 2A is an isometric side view of the cover assembly of the integrated packaging system according to the invention.
Figure 2B:
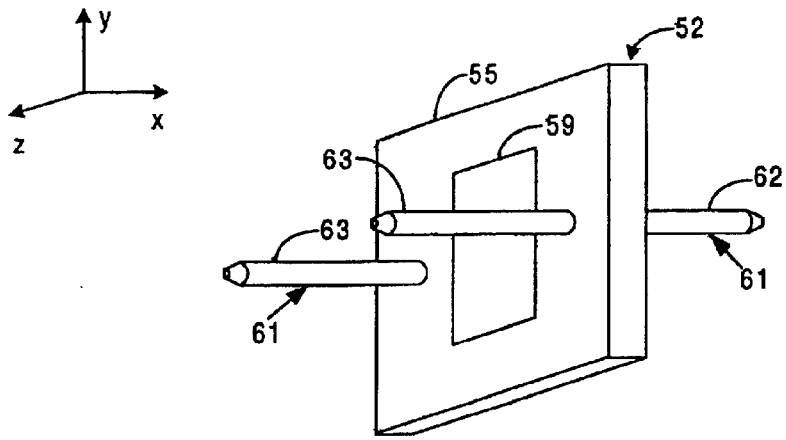
FIG. 2B is an isometric side view of the cover assembly showing optical elements mounted in the window of the cover.

The cover assembly 52 that engages with the device mounting 22 to protect the optical communications device 32 will now be described with reference to FIGS. 1A, 2A and 2B. Optionally, the cover assembly may be dimensioned so that it additionally protects one or more of the electrical components mounted on the portion 26 of the printed circuit board 25. The cover assembly is shown additionally protecting the electronic circuit 36 in FIG. 3A. The cover assembly 52 is composed of the cover 55 and the aligning members 61. The aligning members preferably extend through the thickness of the cover, so that the aligning member portions 62 extend from the cover towards the device mounting as the first cover alignment feature, and the aligning member portions extend from the cover towards the fiber optic connector 64 as the second cover alignment feature.

The window 58 is defined in the cover 55 to prevent the cover from blocking the passage of light to or from the optical communications device 32. The light-transmitting element 59 is mounted in the window, as shown in FIG. 2B, to enable the cover to protect the optical communications device notwithstanding the window in the cover. The light-transmitting element may alternatively cover the window. The light-transmitting element may include a layer of a material, such as glass, that transmits light at the wavelengths of the optical signals that need to pass to or from the optical communications device. In embodiments in which the optical communications device requires less protection than that provided by the embodiment of the cover assembly shown, the cover assembly may be omitted, or the light-transmitting element may be omitted from the window.

The light-transmitting element 59 may alternatively include an array of optical elements, such as a lens array or an array of diffractive optical element. The optical elements may process the light passing between the optical communications device 32 and the fiber optic ribbon 71. When the light-transmitting element includes an array of optical elements, the accurate alignment in the y-z plane of the cover 55 relative to either or both of the device mounting 22 and the fiber optic connector 64 is critical to ensure that the array of optical elements is correctly positioned relative to either or both of the optical communications device or the fiber optic ribbon. This accurate alignment is obtained by mounting the array of optical elements in the cover in an precisely-defined positional relationship relative to the aligning members 61.

Figure 3A:
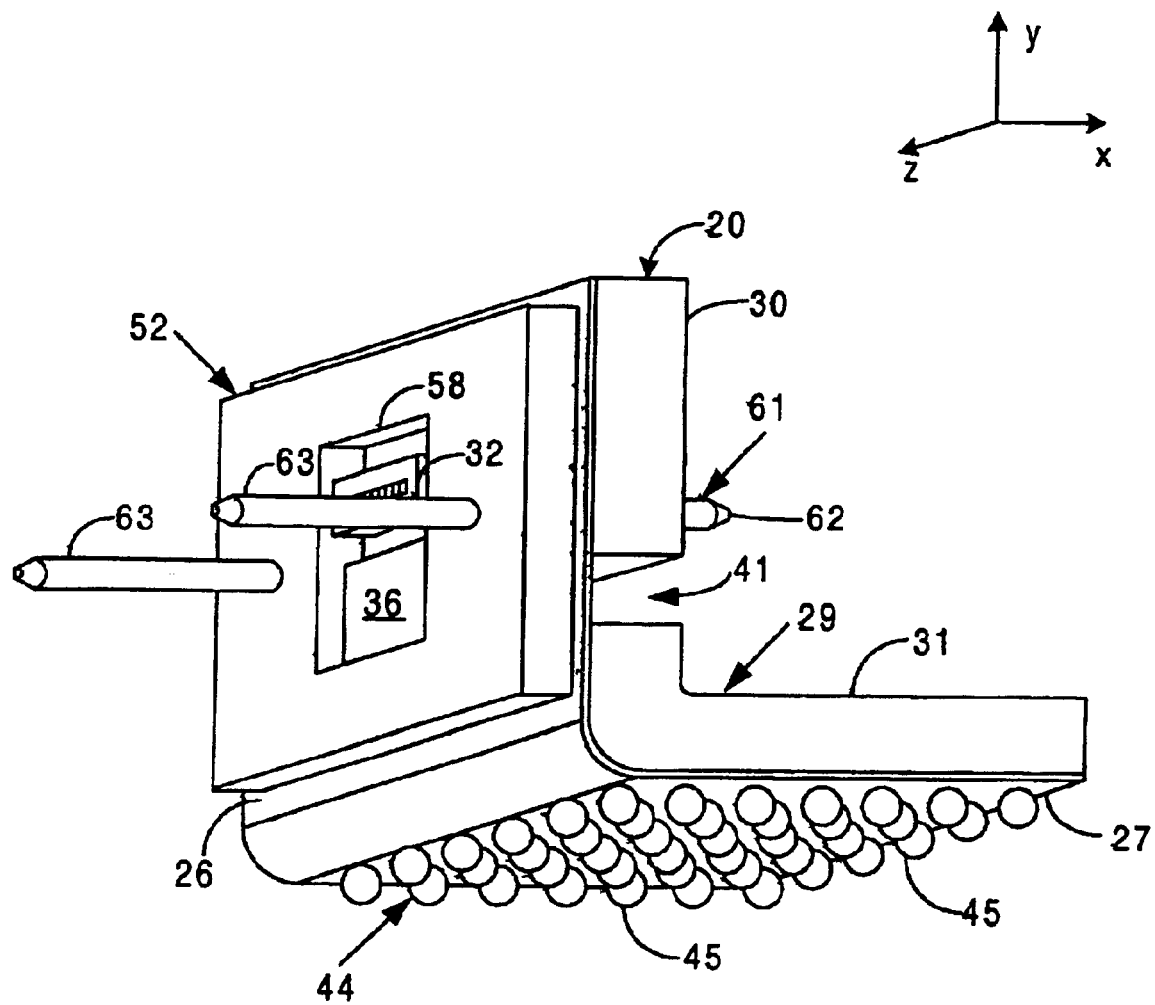
FIG. 3A is an isometric side view of the device package depicted in FIG. 1B fitted with the cover assembly depicted in FIG. 2B.
Figure 3B:
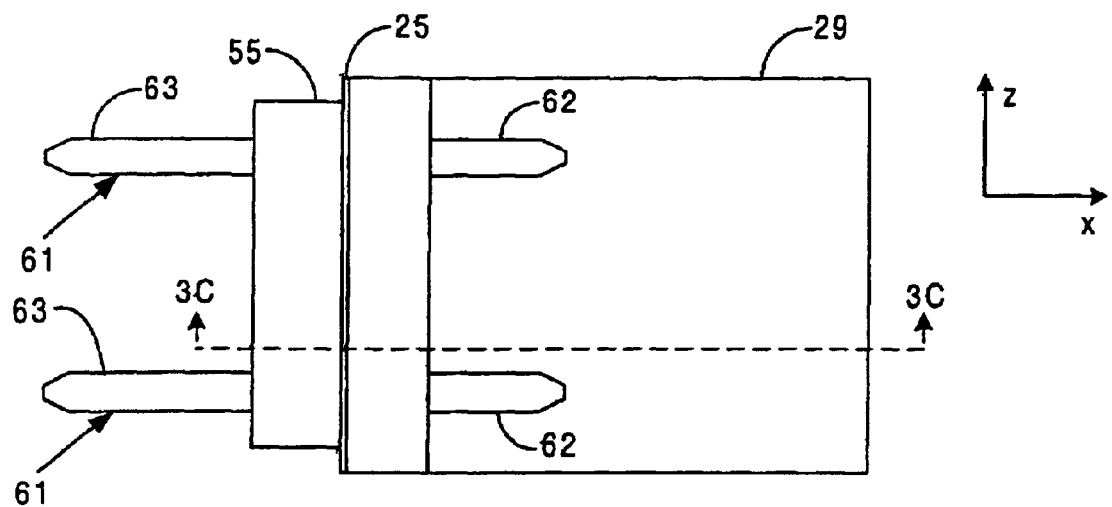
FIG. 3B is a top view of the arrangement depicted in FIG. 3A.
Figure 3C:
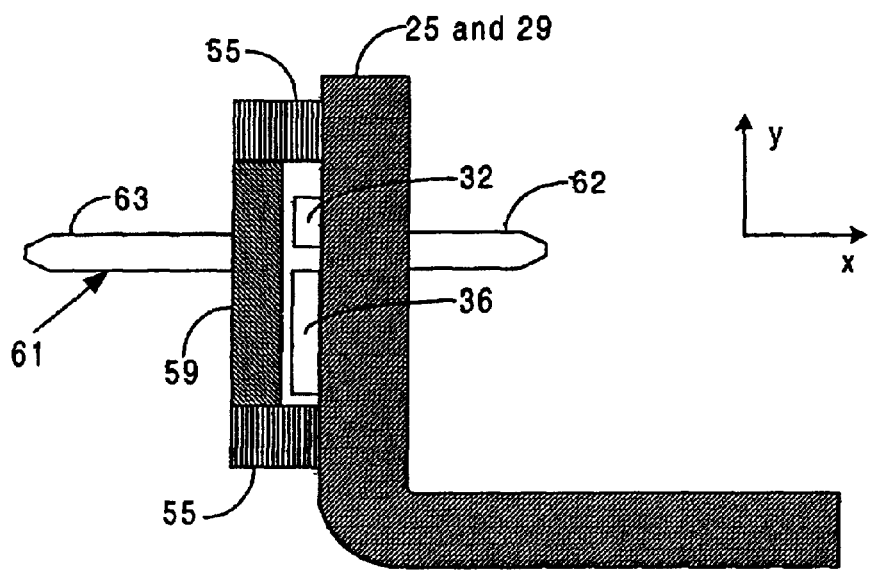
FIG. 3C is a cross-sectional view of the arrangement depicted in FIG. 3B.

As noted above, the cover assembly 52 includes the aligning members 61 that extend through the cover 55 in the x-direction. The cross-sectional shape and size of the portion 62 of each aligning member 61 is substantially the same as the cross-sectional shape and size of the corresponding alignment recess defined by the mechanical support 29. In the example shown, the alignment hole 43 extending into or through the mechanical support provides the alignment recess. Consequently, inserting the aligning member portions 62 into the alignment holes 43 precisely defines the position of the cover 55 relative to the mechanical support in both the y- and z-directions, as shown in FIG. 3A. For example, when the alignment holes 43 are circular in shape in the plane parallel to the surface 33 (FIG. 7) of the mechanical support, each aligning member portion 62 is preferably a cylinder having a diameter a few microns less than the diameter of the corresponding alignment hole 43. This dimensional relationship enables the aligning members to easily fit into the alignment holes 43 while positioning the cover 55 relative to the optical communications device 32 within the required tolerance in both the y- and z-directions. FIGS. 3A–3C are various views showing the cover assembly 52 engaged with the device mounting 22 and protecting the optical communications device 32 and the electrical circuit 36 electrically connected to the portion 26 of the printed circuit board.

Figure 4A:
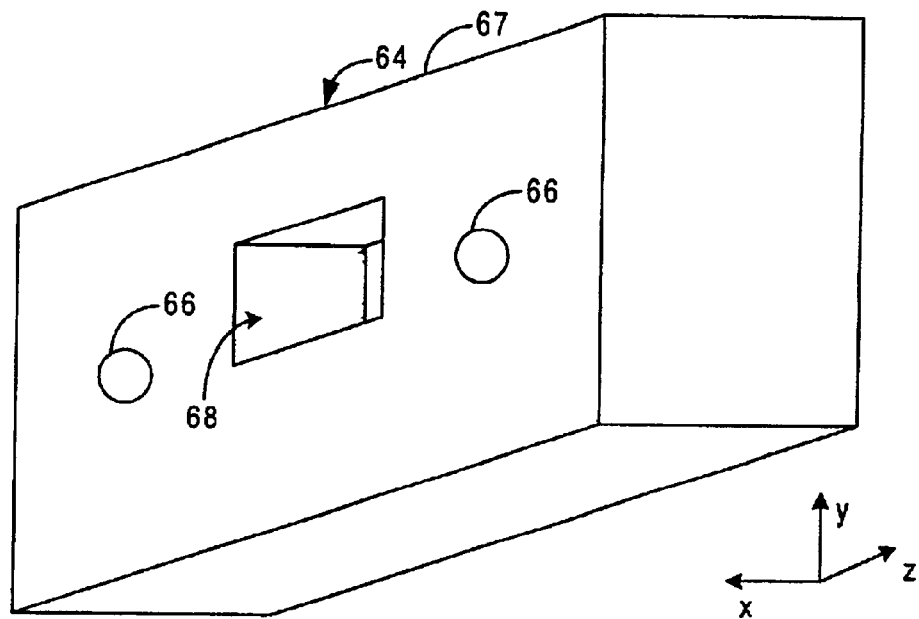
FIG. 4A is an isometric side view of the fiber optic connector of the integrated packaging system according to the invention.

FIG. 4A shows the fiber optic connector 64 that engages with the cover assembly 52. The fiber optic connector is composed of the connector body 67 in which are defined alignment recesses as the connector alignment feature. In the example shown, the alignment holes 66 provide the alignment recesses. The alignment holes are shaped and dimensioned to engage with the second cover alignment features, i.e., the portions 63 of the aligning members 61 that extend from the surface of the cover 55 facing the fiber optic connector. The shape of each alignment hole 66 in the plane parallel to the major surface 65 of the connector body is the same as the shape of the portions 63 of the aligning members 61 in the same plane. The dimensions of each alignment hole in the plane of the surface 65 are a few microns larger than the dimensions of the portion 63 of the corresponding aligning member 61 in the same plane. This dimensional relationship enables the portion 63 of each aligning member to fit easily into the corresponding alignment hole 66 while positioning the fiber optic connector relative to the cover within the required tolerance in both the y- and z-directions when the aligning member portions 63 are inserted into the alignment holes 66.

Figure 4B:
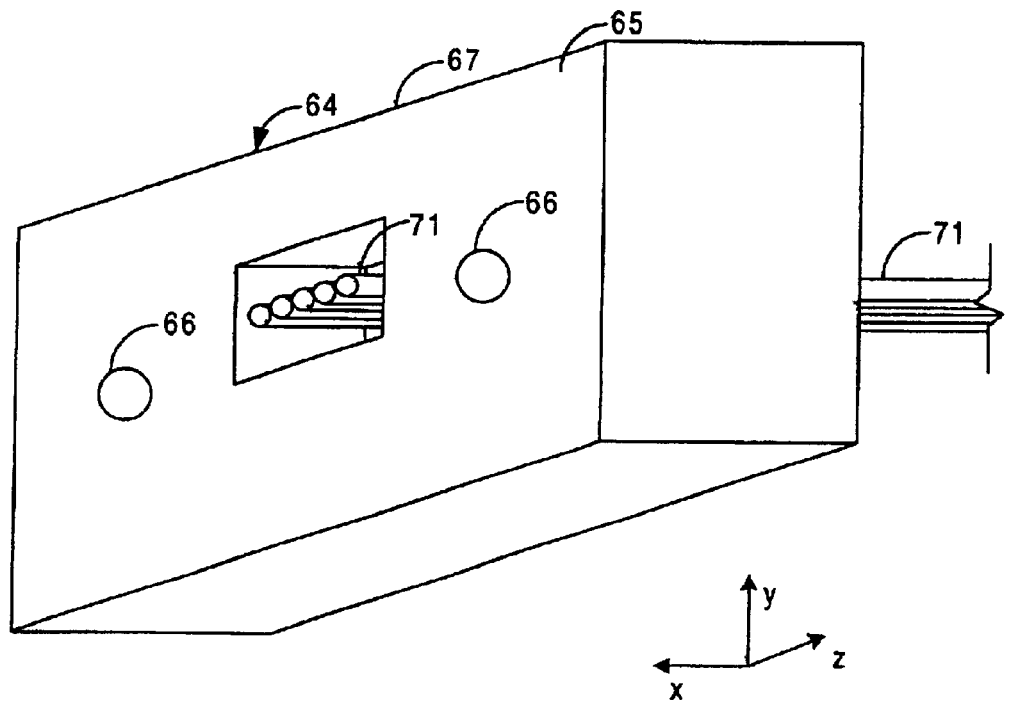
FIG. 4B is an isometric side view of the fiber optic connector depicted in FIG. 4A with a fiber optic ribbon installed in the connector body.

The connector body 67 also defines the window 68 through which the fiber optic ribbon 71 extends, as shown in FIG. 4B. The connector body includes an element (not shown) that secures the fiber optic ribbon in a precisely-defined positional relationship with respect to the alignment holes 66. Securing elements suitable for fiber optic connectors similar to the fiber optic connector 64 are known in the art.

Figure 5:
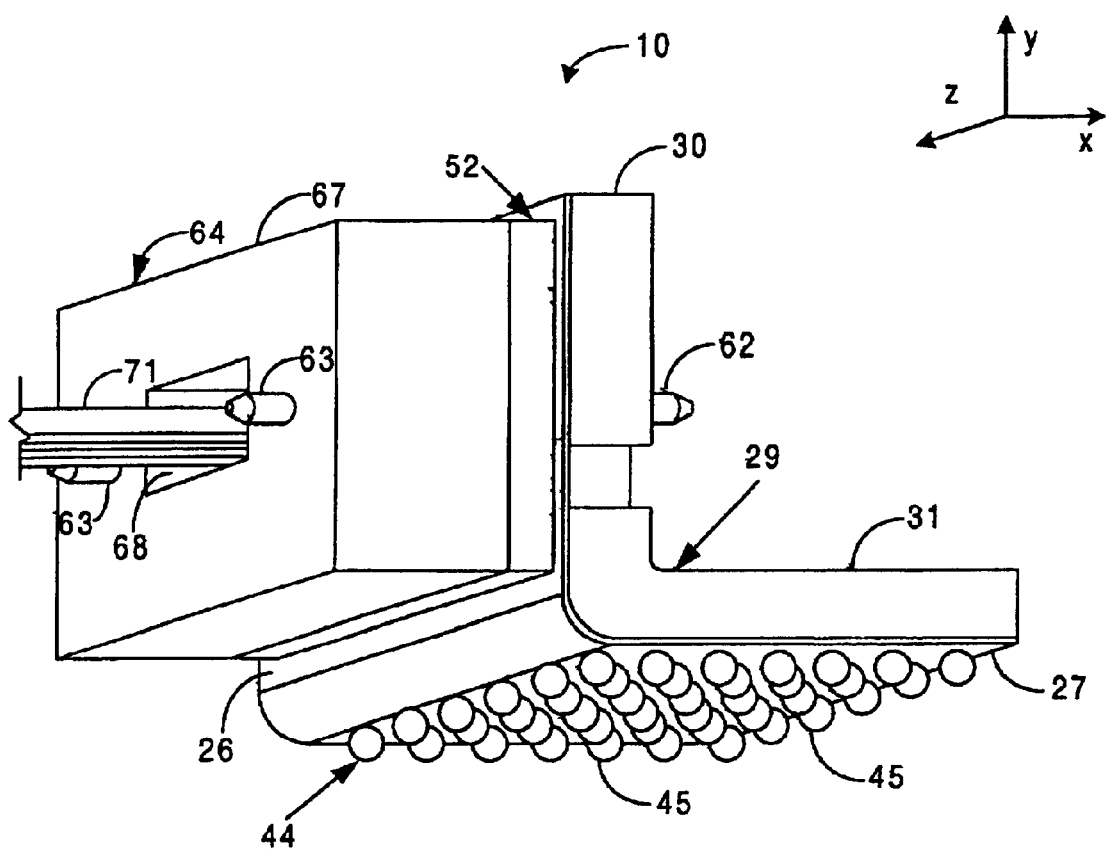
FIG. 5 is an isometric side view of the integrated packaging system according to the invention with the cover assembly shown in FIG. 2A installed on the device mounting and the fiber optic connector shown in FIG. 4B engaged with the cover assembly.

FIG. 5 shows the complete integrated packaging system 10 according to the invention in which the optic connector 64 is engaged with the device package composed of the device mounting 22 and the cover assembly 52. The portions 62 and 63 of the aligning members extend in opposite directions from the cover 55 and respectively engage with the alignment holes 43 and 66 in the mechanical support 29 and in the connector body 67, respectively, to align the cores of the optical fibers constituting the fiber optic ribbon 71 precisely and automatically with the optical communications device 32 (FIG. 1A) mounted on the mechanical support. As a result of this alignment, optical signals pass between the fiber optic ribbon 71 and the optical communications device (FIG. 1A) through the windows 68 and 58 in the connector body (FIG. 4A) and the cover 52 (FIG. 2A), respectively. Since the fiber optic ribbon is precisely aligned with the optical communications device, any residual misalignment minimally impairs the signal-to-noise ratio of the electrical signals generated by the optical communications device in response to optical signals transmitted by the fiber optic ribbon, or of the optical signals in the fiber optic ribbon transmitted by the optical communications device to the fiber optic ribbon.

The aligning members 61 engaging with the alignment holes 43 (FIG. 1A) and 66 (FIG. 4A) precisely aligns the fiber optic ribbon 71 with the optical communications device 32. The aligning members 61 engaging with the alignment holes 43 and 66 align the alignment holes 43 and 66 with respect to each other. Since the optical communications device 32 and the alignment holes 43 have a precisely-defined positional relationship with respect to one another, and since the fiber optic ribbon and the alignment holes 66 have a precisely-defined positional relationship with respect to one another corresponding to the positional relationship between the optical communications device and the alignment holes 43, precisely aligning the alignment holes 43 and 66 relative to one another automatically aligns the fiber optic ribbon relative to the optical communications device.

The optical communications device 32 and the electronic circuit 36 are preferably electrically connected to the portion 26 of printed circuit board 25, as shown in FIG. 1B. Although either or both of the optical communications device 32 and the electronic circuit 36 can be conventionally mounted on the printed circuit board 25, the optical communications device 32 and the electronic circuit 36 are mechanically coupled to the mechanical support 29 and are electrically connected to the printed circuit board 25 in the preferred embodiment, as noted above.

The L-shaped structure of the mechanical support 29 disposes the portion 26 of the printed circuit board substantially perpendicular to the portion 27 of printed circuit board on which the electrical connector 44 is located. This configuration of the mechanical support enables the electrical connector 44 to connect the device package 20 to the mother board 47 (FIG. 1F) while allowing the fiber optic ribbon 71 to run substantially parallel to the mother board and enabling the fiber optic connector 64 to engage with the cover assembly 52 of the device package 20 without having to bend the fiber optic ribbon close to the fiber optic connector. An embodiment of the mechanical support 29 in which the angle between the support elements 30 and 31 is different from 90° can be used in applications in which the fiber optic ribbon does not run parallel to the plane of the mother board.

Figure 6A:
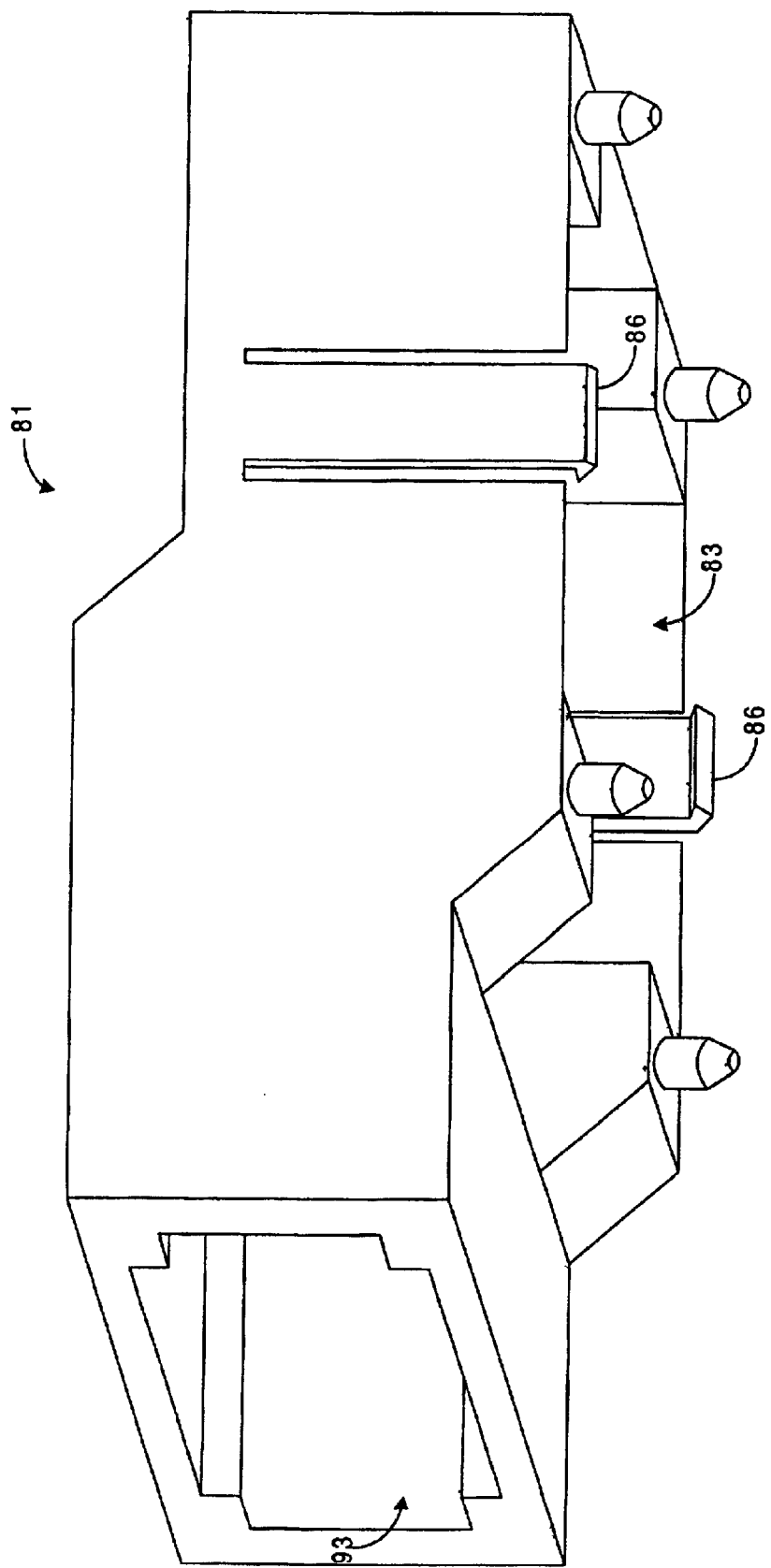
FIG. 6A is an isometric side view of a housing in which the integrated packaging system shown in FIG. 5 can be installed.
Figure 6B:
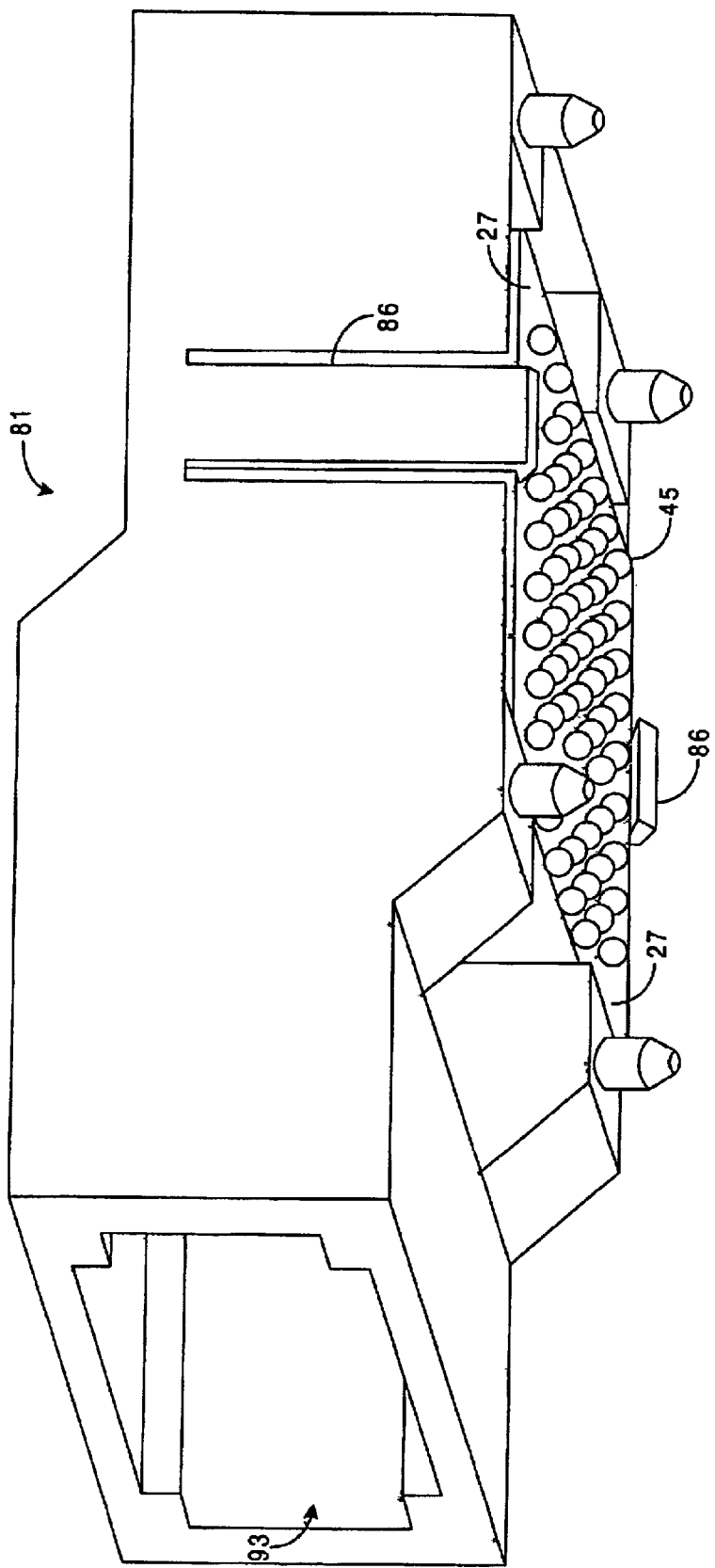
FIG. 6B is an isometric side view of the housing depicted in FIG. 6A with the integrated packaging system shown in FIG. 5 installed in the housing.

FIG. 6A shows the housing 81 that can also form part of the integrated packaging system 10. The housing 81 defines an opening 83 into which the device package 20 is inserted until the prongs 86 engage with the portion 27 of the printed circuit board 25, as shown in FIG. 6B. The prongs 86 retain the integrated packaging system in place in the housing 81. The housing also defines the opening 93 that provides access to engage the fiber optic connector 64 with the cover assembly 52 of the device package. The fiber optic connector 64 is inserted into the opening 93 in the housing and is guided by the walls of the housing until the portions 63 of the aligning members 61 enter the alignment holes 66 in the connector body 67. The fiber optic connector is then advanced until the connector body seats on the cover 55.

Certain aspects of the invention may be used independently of the automatic alignment features described above. For example, a device package may be based on the mechanical support 29 to provide heat sinking and a low-impedance current path for the optical communications device 32 and other electronic circuits associated with the optical communications device but may lack the automatic alignment features described above. In this case, other structures for aligning the fiber optic ribbon with the optical communications device must be provided, or the fiber optic ribbon must otherwise be aligned with the optical communications device. However, the automatic alignment features of the preferred embodiment usually provide easier and less expensive alignment than alternative alignment structures or methods.

Figure 2C:
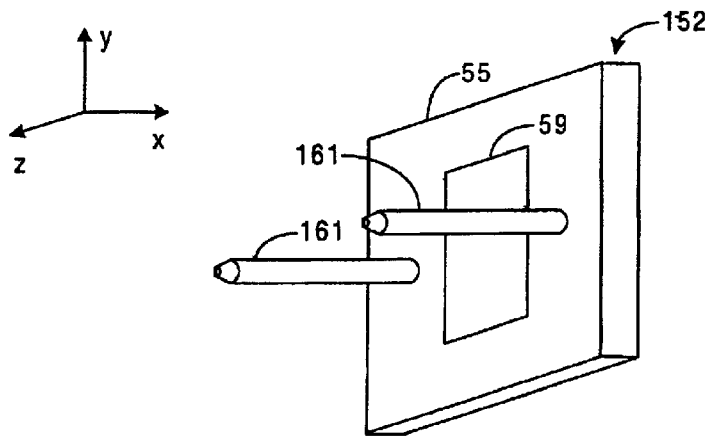
FIG. 2C is an isometric side view of an alternative embodiment of the cover assembly.

The first and second cover alignment features may be omitted from the integrated packaging system according to the invention. Such an embodiment can nevertheless automatically align the fiber optic ribbon 71 with the optical communications device 32. In such an embodiment, the mechanical support lacks the alignment holes 43, and the device alignment feature is included in the modified cover assembly 152 shown in FIG. 2C. In the cover assembly 152, the aligning members 161 function as the device alignment feature, and extend only from the surface of the cover 55 facing the fiber optic connector 64. The aligning members are shaped to engage with the alignment holes 66 in the connector body 67.

During assembly of the device package 20, an active alignment system is used to align the cover assembly 152 with the optical communications device 32 prior to securing the cover assembly to the device mounting 22. For example, pattern recognition or other known techniques may be applied to the optical communications device and the aligning members 161 to position the cover assembly on the device mounting in a location at which the aligning members and the optical communication device 32 have a precisely-defined positional relationship with respect to one another. Holes or slots may be provided in the printed circuit board 25, or the printed circuit board may be appropriately shaped, to enable the cover assembly to be bonded directly to the mechanical support 29.

Alternatively, if the optical communications device 32 includes transmitting elements, electrical signals may be applied to the transmitting elements via the electrical connector 44 to cause the transmitting elements to generate optical signals. An alignment connector is engaged with the aligning members 161 extending from the cover 55 of the cover assembly 152. The optical signals at the end of the fiber optic ribbon 71 remote from the alignment connector are monitored, and the position of the cover assembly relative to the device package 20 is manipulated until the optical signals have a maximum signal-to-noise ratio, or some other indication of an optimal alignment of the cover assembly is obtained. A similar active alignment technique may be applied when the optical communications device includes only receiving elements. In this case, optical signals are applied to the end of the fiber optic ribbon remote from the alignment connector, and the signal-to-noise ratio of the electrical signals generated by the optical communications device is monitored while the position of the modified cover assembly is optimized.

After the cover assembly 152 has been optimally positioned, it is affixed to the device mounting 22, preferably to the mechanical support 29, and the alignment connector is disengaged from the cover assembly. Then, the fiber optic ribbon of any fiber optic connector having the same positional relationship of the fiber optic ribbon with respect to the alignment holes 66 as that of the fiber optic ribbon with respect to the alignment holes 66 of the alignment connector will be accurately aligned relative to the optical communications device when such fiber optic connector is engaged with the cover assembly 152.

The embodiments of the alignment features exemplified by the aligning members 61 and the alignment holes 43 and 66 shown in the drawings are not critical to the invention, and other alignment features may be used. For example, the alignment recesses exemplified by the alignment holes 43 need not pass all of the way through the mechanical support 29, but each may instead have only one opening that receives the corresponding aligning member 61. A different number of aligning members 61 from that shown can be used, and the aligning members and alignment recesses can have different shapes and structures from those shown. For example, the portions 62 and 63 of the aligning members can be shaped as balls, as cones, or as any other suitable shape having circular or non-circular cross-sections, and the alignment recesses can be shaped accordingly.

The aligning member portions 63 can also be shaped to engage with the alignment features on the connector body 67 other than the alignment recesses exemplified by the alignment holes 66. For example, each aligning member portion can have an L-shaped cross-sectional shape in a plane parallel to the major surface of the cover 55 and can be positioned to engage with at least the diagonally-opposite corners of the connector body. In such an embodiment, the diagonally-opposite corners of the connector body serve as the connector alignment feature. The L-shaped aligning member portions engaging with the diagonally-opposite corners of the connector body defines the position of the fiber optic connector 64 in the y- and z-directions. A similar arrangement can be used to align the cover relative to the support member 29.

In further variations, aligning members similar in configuration to the aligning members 61 may extend from the fiber optic connector 64 as the connector alignment feature, or may extend from the mechanical support 29 as the device alignment feature. In the former case, the aligning members engage in the alignment holes 43 defined by the mechanical support as the device alignment feature, while in the latter case, the aligning members engage in the alignment holes 66 defined by the fiber optic connector as the connector alignment feature. If the positioning of the cover 55 is also critical, alignment holes may also be defined by the cover as the cover alignment feature, and aligning members extending from the fiber optic connector or the mechanical support may additionally pass through such alignment holes. As a yet further variation, alignment holes may be defined by the cover and aligning members may extend from the cover. Aligning members extending from one of the fiber optic connector and the mechanical support may engage in the alignment holes defined by the cover, and the aligning members extending from the cover may engage in alignment holes defined by the other of the fiber optic connector and the mechanical support. Many other variations of the alignment features are possible within the scope of the invention.

If no optical element is mounted in or over the window 58 in the cover 55, or if the an alignment-insensitive optical element is mounted in or over the window, or if the cover is light-transmitting, the cover may be configured so that it does not interfere with engagement between alignment features of the mechanical support 29 and the connector 64. For example, the cover may be dimensioned relative to the spacing between the aligning members 61 so that the cover fits between the aligning members. Alternatively, holes can be defined in the cover dimensioned to allow the aligning members or other alignment features forming part of the mechanical support or the connector to pass through.

Aligning members similar in configuration to the aligning members 61 may also be affixed to the surface 33 (FIG. 7) of the mechanical support 29 or to the surface of the cover 55 as the device alignment feature. The aligning members may be affixed using an adhesive, such as epoxy, by soldering or welding, or by some suitable affixing element such as a screw or rivet. With the aligning members so affixed, the alignment holes 43 are unnecessary. In this case, during assembly of the device package 20, the optical communications device 32 is precisely aligned relative to the aligning members 61 themselves or relative to the point on the surface 33 where the aligning members will be later affixed to define the positional relationship between the device alignment feature and the optical communications device.

The construction, preferred use and operation of the integrated packaging system according to the invention will now be described.

Referring first to FIGS. 1A–1F, the mechanical support 29 is formed by bending a piece of sheet material of the appropriate dimensions through about a right angle about half-way along its length to define the support element 30 that extends from the support element 31 at approximately right angles. Techniques for performing this operation are well known so will not be described further. The material of the mechanical support is preferably copper about 1 millimeter thick, although other materials and thicknesses may be used. For example, the mechanical support may be die cast in aluminum, which eliminates the need for the bending operation just described. As a further example, the support elements 30 and 31 may be separately fabricated and may then be joined to one another to form the mechanical support. In embodiments in which the mechanical support does not have to be electrically and thermally conductive, the mechanical support may also be molded from a suitable plastic, such as polycarbonate.

Drilling, fine blanking or some other suitable machining process is used to form the alignment holes 43 in the mechanical support 29 and to form the notches 41 in the support element 30 constituting part of the mechanical support. The alignment holes 43 extend into the mechanical support from the surface 33 of the mechanical support. The completed mechanical support is shown in FIG. 7.

Next, the flexible printed circuit board 25 is made using conventional printed circuit board fabrication techniques. The printed circuit board includes the access holes 42 (FIG. 1D) that provide access through the printed circuit board to the alignment holes 43 in the mechanical support 29. The access holes 42 can be of any size and shape as long as they expose the alignment holes 43 in the mechanical support and do not obstruct insertion of the aligning members 61 into the alignment holes 43 when the printed circuit board is mounted on the mechanical support. To this end, the access holes 42 should be slightly larger than the alignment holes 43.

Figure 8A:
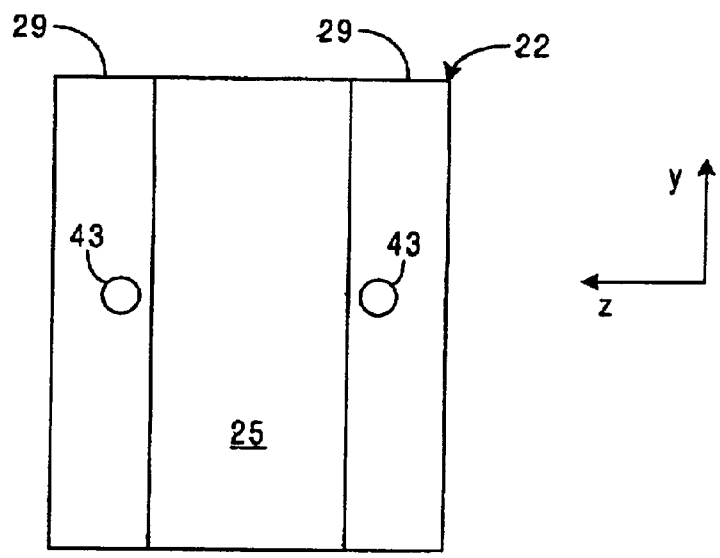
FIG. 8A is a front view of part of the mechanical support in which a first alternative embodiment of the printed circuit board is mounted.
Figure 8B:
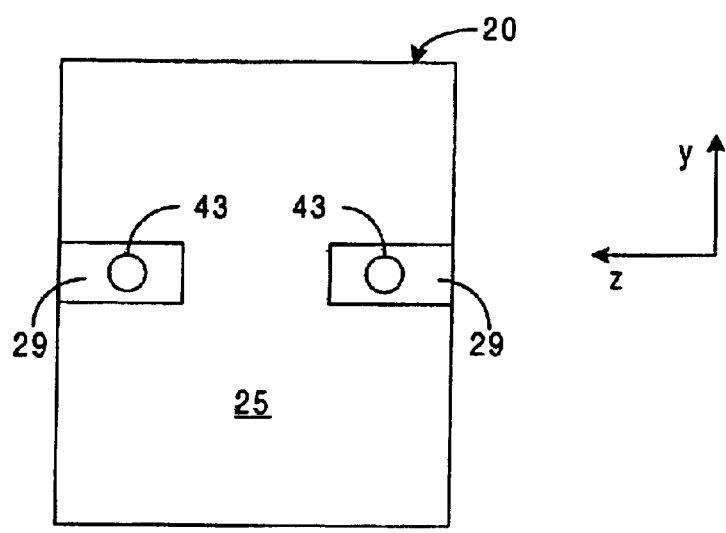
FIG. 8B is a front view of part of the mechanical support on which a second alternative embodiment of the printed circuit board is mounted.

Alternatively, the printed circuit board 25 can be made without the access holes 42 if it is otherwise configured to expose the alignment holes 43 in the mechanical support 29. FIGS. 8A and 8B show two alternative embodiments of the printed circuit board that lack the access holes 42 and expose the alignment holes 43 in the mechanical support by making the width of the printed circuit board less than the distance between the alignment holes (FIG. 8A) or by defining slots in the printed circuit board (FIG. 8B).

Fabrication of the printed circuit board 25 includes mounting various electronic components on the printed circuit board, and electrically connecting to the printed circuit board those components, such as the optical communications device 32 and the electronic circuit 36, that will later be mechanically attached to the mechanical support 29. Fabrication of the printed circuit board also includes electrically connecting the electrical connector 44 to the portion 27 of the printed circuit board. In the preferred embodiment, the electrical connector is formed on the printed circuit board by forming solder balls, such as the solder ball 45, on an array of pads (the exemplary pad 48 is shown in FIG. 1F) on the portion 27 of the printed circuit board (FIG. 1B).

The printed circuit board 25 is then attached to the mechanical support 29 with the access holes 42 in the printed circuit board concentric with the alignment holes 43 in the mechanical support. Techniques, such as laminating, suitable for attaching or affixing the printed circuit board 25 to the mechanical support 29 are known in the art and will therefore not be described here. Attaching the printed circuit board on the mechanical support also involves mechanically coupling the optical communications device 32 and the electronic circuit 36 electrically connected to the printed circuit board to the mechanical support. The completed device mounting 22 is shown in FIG. 1B. The process of attaching the printed circuit board to the mechanical support positions the optical communications device in a precisely-defined positional relationship with respect to the alignment holes 43 in the mechanical support. Precisely positioning the optical communications device relative to the alignment holes 43 results in the optical communications device being precisely positioned relative to the aligning members 61 when the latter are inserted into the alignment holes 43.

A number of vision-aided alignment processes are known that can be employed to align the optical communications device 32 relative to the alignment holes 43 in the mechanical support 29 with the required precision. In embodiments in which multi-mode optical fibers constitute the fiber optic ribbon 71, the alignment process should position the optical communications device relative to the alignment holes 43 within a tolerance of approximately ±15 μm to enable effective optical communication between the fiber optic ribbon and the optical communications device. However, better results are obtained by reducing the tolerance to less than approximately ±10 μm. In embodiments in which single-mode optical fibers constitute the fiber optic ribbon, the tolerance should be less than about ±2 μm, and should preferably be less than ±1 μm.

The process just described establishes a precisely-defined positional relationship between the optical communications device 32 and the alignment holes 43 in the mechanical support 29. Moreover, connector body 67 of the fiber optical connector 64 is constructed to establish a positional relationship between the fiber optic ribbon 71 and to the alignment holes 66 in the connector body corresponding to the positional relationship between the optical communications device and the alignment holes 43. The aligning members 61 constituting part of the cover assembly 52 align the alignment holes 43 in the mechanical support with the alignment holes 66 in the connector body. Therefore, when the aligning members 61 engage with the alignment holes 43 and 66 in the mechanical support and the connector body, respectively, the optical fibers constituting the fiber optic ribbon 71 are precisely aligned with the optical communications device 32.

In an exemplary embodiment of the integrated packaging system according to the invention, the center of the core of one of the optical fibers constituting the fiber optic ribbon 71 is located 1 mm from the center of one of the alignment holes 43 in the x-direction and 0 mm from the center of the alignment hole 43 in the y-direction when the fiber optic connector 64 is engaged with the cover assembly 52, as shown in FIG. 5. The optical communications device 32 is positioned so that the distance of the center of the corresponding transmitting element or receiving element thereof from the alignment hole 43 is located within approximately ±15 μm of a point 1 mm from the center of the alignment hole 43 in the x-direction and within ±15 μm of a point 0 mm from the center of the alignment hole 43 in the y-direction. When the fiber optic connector is engaged with the cover assembly, the above-mentioned optical fiber is accurately aligned with the corresponding transmitting element or receiving element of the optical communications device, and effective optical communication takes place between the optical fiber and the element of the optical communications device. The above-mentioned distances are stated for illustrative purposes only, and the invention can be implemented using other distances between an element of the optical communications device and the alignment hole 43.

Once the device mounting 22 shown in FIG. 1B has been made, the cover assembly 52 is installed to form the device package 20. The portions 62 of the aligning members 61 extending from the cover 55 (FIG. 1A) are inserted through the access holes 42 into the alignment holes 43, and the cover assembly is advanced until the cover seats on the printed circuit board 25. Once the cover seats on the printed circuit board 25, the portions 62 aligning members 61 are affixed to the mechanical support to prevent the cover assembly moving in the x-direction. The aligning members may be affixed to the mechanical support using epoxy or some other suitable adhesive. Nuts applied to threaded portions (not shown) of the aligning members, clips applied to the aligning members, pins inserted radially through the aligning members or other suitable affixing devices may alternatively be used.

If the integrated packaging system includes the housing 81, the device package 20 is inserted and secured in the housing.

In the preferred embodiment, the device package 20 is installed on the mother board 47 (FIG. 1F) having an array of pads 46 corresponding to the array of the solder balls 45 constituting the electrical connector 44. The device package is placed on the mother board with the solder balls in contact with the pads. The solder balls are then heated to melt them. When the solder cools and solidifies, the solder attaches and electrically connects the device package to the pads on the mother board. Additional mechanical attachment may be provided by the prongs 86 on the housing 81 engaging in slots formed in the mother board.

Fabrication of the integrated packaging system 10 is completed by connecting the fiber optic connector 64 to the device package 20. One end of the fiber optic ribbon 71 is installed in the connector body 67 of the fiber optic connector. The fiber optic connector is inserted into the opening 93 in the housing 81, and is guided by the walls of the housing until the portions 63 of the aligning members 61 engage with the alignment holes 66 in the connector body. The fiber optic connector is advanced into the housing until it seats on the cover 55. Once the fiber optic connector seats on the cover, the fiber optic connector is affixed to the portions 63 of the aligning members 61 to prevent the fiber optic connector from moving in the x-direction. A suitable spring locking mechanism may be used to affix the fiber optic connector. Such a mechanism can later be unlocked to allow the fiber optic connector to be disconnected from the device package.

Since the fiber optic ribbon 71 is located in a precisely-determined position relative to the alignment holes 66 in the connector body 67 of the fiber optic connector 64, the optical fibers constituting the fiber optic ribbon directly face, and are precisely aligned with, the corresponding elements of the optical communications device 32 when the fiber optic connector seats on the cover 55. Consequently, optical signals can pass between the fiber optic ribbon and the optical communications device.

When optical signals transmitted by the fiber optic ribbon 71 are received by the optical communications device 32, the optical communications device converts the optical signals into electrical signals. The electrical signals then pass through the conductive tracks on the printed circuit board 25 to the electronic circuit 36, which amplifies the electrical signals. The amplified electrical signals then pass through additional conductive tracks and additional electronic components on the printed circuit board to the electrical connector 44, through which the amplified electrical signals pass to conductive tracks on the mother board.

Alternatively, when the optical communications device 32 transmits optical signals, the integrated packaging system 10 receives electrical signals through the electrical connector 44. The electrical signals pass via the conductive tracks on the printed circuit board 25 to the electronic circuit 36. The electronic circuit processes the electrical signals. For example, the electronic circuit may generate drive signals suitable for driving the optical communications device 32. The drive signals then pass to the optical communications device 32 through additional conductive tracks on the printed circuit board. The optical communications device 32 converts the drive signals into optical signals and transmits the optical signals to the fiber optic ribbon 71. The optical signals pass to the fiber optic ribbon through the transparent layer 59 mounted in the window 58 in the cover 55, and through the window 68 in the connector body 67.

Thus, in the integrated packaging system 10, simply plugging the fiber optic connector 64 carrying the fiber optic ribbon 71 into the device package 20 precisely aligns the fiber optic ribbon with the optical communications device 32 included in the device package, and enables optical signals to pass between the fiber optic ribbon and the optical communications device. Compared with conventional packaging systems for optical communications devices, the simplicity and efficiency of the integrated packaging system according to the invention significantly reduces the cost of precisely aligning the fiber optic ribbon with the optical communications device. The integrated packaging system according to the invention automatically and precisely aligns the fiber optic ribbon with the optical communications device by the aligning members 61 engaging with the alignment holes 43 and 66.

Figure 9:
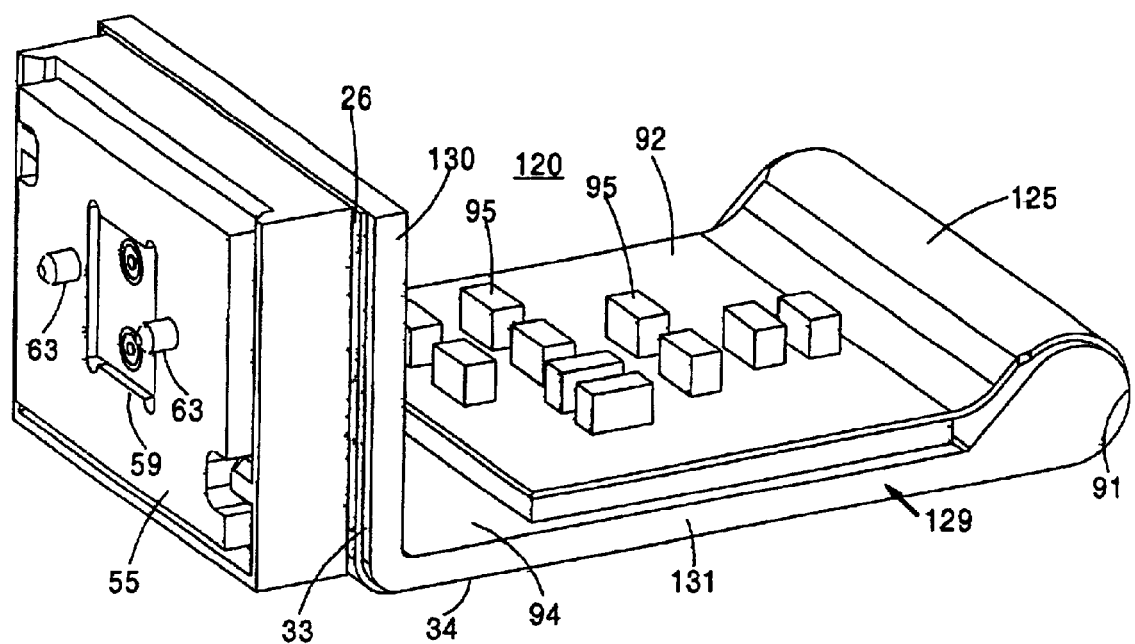
FIG. 9 is an isometric side view of an alternative embodiment of the device package in which the flexible printed circuit is larger in area than the combined areas of the surfaces of the support elements constituting the mechanical support.

In the embodiments described above, the printed circuit board 25 is depicted as being substantially co-extensive in area with the surfaces 33 and 34 of the mechanical support 29. However, this is not critical to the invention. The flexible printed circuit can have an area smaller than the combined areas of the surfaces 33 and 34 of the mechanical support. Alternatively, the flexible printed circuit can have an area larger than the combined areas of the surfaces of the mechanical support. FIG. 9 shows an example of an embodiment of the device package 120 in which the flexible printed circuit is larger in area than the combined areas of the surfaces of the mechanical support. Elements of the device package shown in FIG. 9 that correspond to elements of the device mounting shown in FIGS. 1A–1F and the device package shown in FIGS. 3A–3C are indicated using the same reference numerals and will not be described again here.

In the device package shown in FIG. 9, the printed circuit board 125 has substantially the same width as the mechanical support 129, but has a length substantially greater than the combined lengths of the surfaces 33 and 34 of the mechanical support. The end portion 91 of the support element 131 constituting part of the mechanical support is rounded, and the portion 92 of the printed circuit board that extends beyond the end portion 91 of the support element 131 is wrapped around the end portion and is bonded to the inside surface 94 of the support element 131. Prior to attaching the printed circuit board to the mechanical support, additional active and passive electronic components can be mounted on the portion 92 of the printed circuit board. Examples of such additional electronic components are shown at 95.

The additional electronic components can be electrically connected to the portion 92 of the printed circuit board 125, and can also be mechanically coupled to the mechanical support 129 to enable the mechanical support to act as a heat sink, to provide a low-impedance current path, or both. Folding the printed circuit board around the end of the mechanical support as shown increases the area of the printed circuit board without increasing the overall size of the optical device package. A printed circuit board having an area even greater than that shown can be accommodated by rolling the printed circuit board in the space between the support elements 130 and 131. As a further alternative, a separate rigid or printed circuit board assembly (not shown) can be attached by suitable conductors to connections available on the exposed areas of the portion 92 of the printed circuit board.

Although this disclosure describes illustrative embodiments of the invention in detail, it is to be understood that the invention is not limited to the precise embodiments described, and that various modifications may be practiced within the scope of the invention defined by the appended claims.

We claim:

1. An integrated packaging system for packaging an optical communications device, the packaging system comprising:
   a mechanical support including a first support element and a second support element, the first support element extending at a non-zero angle from the second support element;
   an insulating substrate including a first portion and a second portion in contact with the first support element and the second support element, respectively, the first portion being contoured to define at least one access hole;
   the optical communications device and an electronic circuit mechanically coupled to the first support element of the mechanical support, at least one of the optical communications device and the electronic circuit being mechanically coupled to the first support element through a respective one of the at least one access hole; and
   a conductive track extending between the electronic circuit and the optical communications device on the first portion of the insulating substrate.

2. The integrated packaging system of claim 1, in which:
   the mechanical support is thermally conductive; and
   at least one of the optical communications device and the electronic circuit is thermally coupled to the first support element to enable the mechanical support to function as a heatsink for the at least one of the optical communications device and the electronic circuit.

3. The integrated packaging system of claim 1, in which the insulating substrate is flexible.

4. The integrated packaging system of claim 1, in which the optical communications device is electrically insulated from the mechanical support.

5. The integrated packaging system of claim 2, in which the insulating substrate is flexible.

6. The integrated packaging system of claim 2, in which the optical communications device is electrically insulated from the mechanical support.

* * * * *